United States Patent [19]

McMahon et al.

[11] Patent Number: 5,616,851
[45] Date of Patent: Apr. 1, 1997

[54] EX-SITU GRAIN MOISTURE ANALYZER FOR A COMBINE

[75] Inventors: Mike McMahon, Salem; Larry A. Jeffers, Alliance; Fred White, Beloit, all of Ohio

[73] Assignee: Farmex Inc., Aurora, Ohio

[21] Appl. No.: 536,209

[22] Filed: Sep. 29, 1995

[51] Int. Cl.⁶ .................. A01F 12/00; G08B 21/00; A01C 7/00
[52] U.S. Cl. .................. 73/29.01; 73/335.03; 460/7; 56/1
[58] Field of Search .................. 73/29.01, 335.03, 73/335.04; 460/7; 56/1

[56] References Cited

U.S. PATENT DOCUMENTS

| | | | |
|---|---|---|---|
| 3,606,745 | 9/1971 | Girodat | 56/20 |
| 3,807,055 | 4/1974 | Kraxberger | 34/16.5 |
| 4,632,879 | 12/1986 | Tanaka et al. | 428/522 |
| 4,916,830 | 4/1990 | Braun et al. | 34/48 |
| 5,015,997 | 5/1991 | Strubbe | 340/684 |
| 5,046,362 | 9/1991 | Strubbe | 73/579 |
| 5,092,819 | 3/1992 | Schroeder et al. | 460/7 |
| 5,097,212 | 3/1992 | Carlon et al. | 324/464 |
| 5,106,339 | 4/1992 | Braun et al. | 460/7 |
| 5,327,708 | 7/1994 | Gerrish | 56/1 |

Primary Examiner—Hezron E. Williams
Assistant Examiner—J. David Wiggins

[57] ABSTRACT

A combine thresher has a multiple plate impedance cell grain moisture analyzer assembly with two of the plates being outside mounted ground plates to reduce EMI and RFI interference and provide more accurate moisture measurements. The assembly is ex-situ mounted to bypass a part of the grain flowing from the grain floor of the harvester to the grain accumulation bin to measure the moisture thereof and to exhaust same back into the mentioned grain flow. The analyzer has a bin full sensor to activate the bypass only when the analyzer is full for accurate moisture measurement.

30 Claims, 4 Drawing Sheets

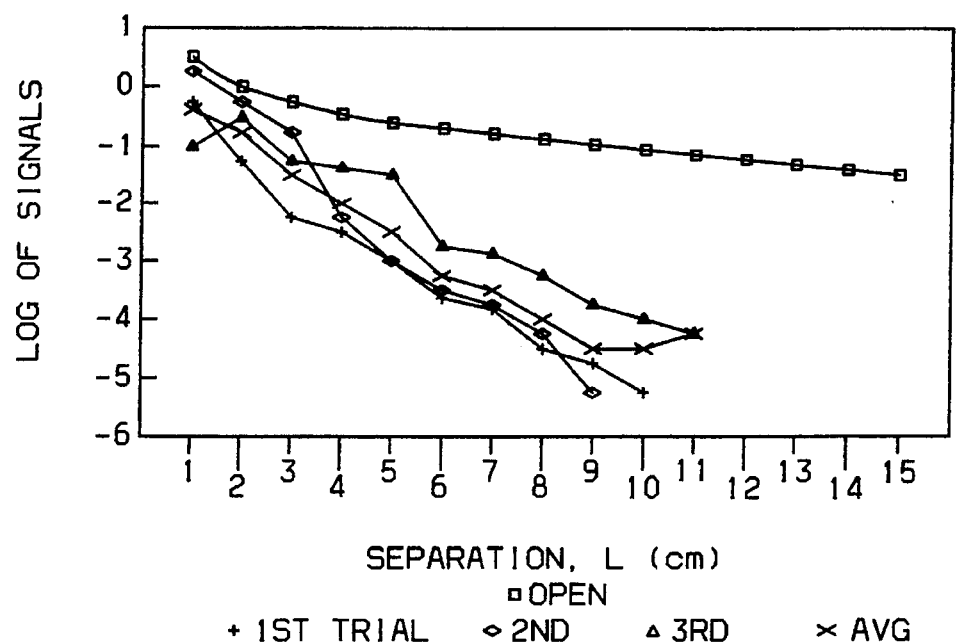
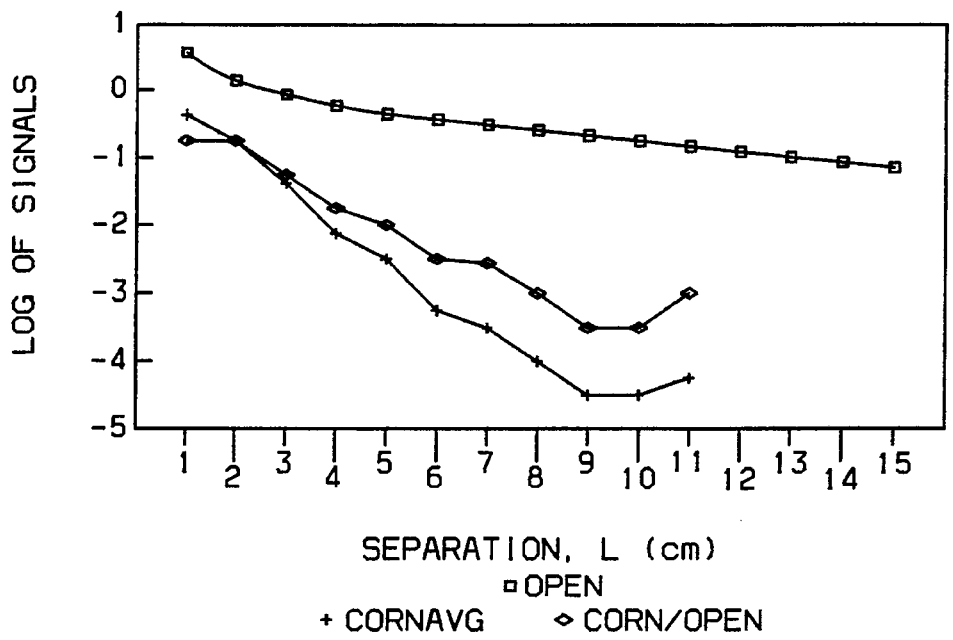
FIG 7

EX-SITU GRAIN MOISTURE ANALYZER FOR A COMBINE

BACKGROUND OF THE INVENTION

1. Field of the Invention

The present invention relates generally to systems and methods for monitoring moisture of grain as it is being harvested by a combine thresher and more particularly to such systems which are mounted externally on combine threshers.

2. Description of the Prior Art

A combine thresher, is used by farmers to harvest grain. The combine cuts the grain plants growing in a field and separates the grain from the rest of the plant. A combine draws the plants into the combine using a thresher mechanism. Grates separate the grain from the rest of the plant, often called the chaff, in some instances by having a fan blow away the lighter chaff from the relatively heavy grain. The separated grain, often called clean grain, is collected at the bottom of the thresher on the grain floor and is moved by an auger located there to an elevator which raises the grain to a grain accumulator or bin where the grain is held for off loading to transport trucks. A bin auger feeds the grain bin from the grain elevator top discharge.

The clean grain collected in the bin of the combine is eventually transferred to trucks and taken to drying bins, to farm storage, or directly to grain elevators. Where the grain is taken often depends on the moisture content of the grain. Proper grain requires to be below a certain moisture content. Wet harvested grain must be first dried in a drying bin to lower the moisture content before it is stored. Thus there are obvious advantages to keeping track of the moisture of the grain as it is being harvested by the combine.

Also, some farmers use a grid system which may be stored in a computer data base to plot out each of their fields on paper. The grid system is used to keep track of yield due to different weather factors and grain conditions for each section of the grid, where each section corresponds to a certain area of the actual field. Because moisture content is such an important factor in grain production, it is very advantageous for the farmer to monitor and keep track of the moisture content of grain being harvested from any grid section of the field to provide corrections as needed thereto for uniform production.

Combine threshers are known to include in-situ moisture analyzers which are temperature compensated for measuring the moisture content and temperature of the harvested grain. An example of such is disclosed in U.S. Pat. No. 5,106,339. Such in-situ moisture monitoring systems include a sensor assembly positioned in the clean grain auger of the harvester for sensing the moisture content of grain moving through the auger. The operation of the moisture monitoring system is controlled by a microprocessor which controls a display connected to the moisture monitoring system for displaying the moisture of the grain flowing through the clean grain auger. Additionally, the microprocessor samples the moisture readings and averages them over a selectable period of time.

Mounting the sensor internally to the auger creates a number of problems which include:

the output readings are subject to errors due to variations in the density of the grain flowing past the sensor, the output readings are subject to errors due to the gradual buildup of deposits on the sensor, the sensor is difficult to access for cleaning and repair, it is expensive and time consuming to install the sensor on existing combines.

Thus, there is a need for a sensor with improved performance that can be easily and inexpensively retro fitted to existing combines.

BRIEF SUMMARY OF THE INVENTION

The present invention solves the problems associated with prior art combine mounted moisture analyzers as well as others by providing a combine moisture analyzer assembly which is externally mounted ex-situ of the combine.

The moisture analyzer assembly includes a moisture sensing cell through which grain is passed by an external feed mechanism which bypasses a small portion of grain from an appropriate location on the combine, such as the combine bin auger or elevator. The feed mechanism is enabled only when the sensing cell is filled with grain and the grain is passed only with the test cell maintained full for proper moisture measurement.

The analyzer assembly is mounted on an external wall of the combine that contains the flow of grain, and grain is driven into the sensing cell of the analyzer assembly from a hole formed in the wall. The momentum of the contained grain flow allows it to be easily diverted into the sensor chamber. Once the sensor cell is filled with grain, a moisture measurement can take place. When the cell is full, the grain discharge mechanism is enabled, slowly discharging the grain back into the normal clean grain flow within the combine. This is the typical operating mode. Namely, the grain is continuously moved through the test chamber or sensing cell with the moisture being continuously sampled. If the cell is not full, as determined by a cell full indicator such as grain level indicating optoelectronics, the grain discharge mechanism is disabled and no moisture readings are taken until the test chamber is once again full.

To control the moisture analyzer operation, and the cell full detector optoelectronics, and the grain discharge feed, a microcontroller or microprocessor is used. This microprocessor contains a number of peripheral functions internally. For example the microprocessor contains internal: RAM, an interrupt controller, multiple digital input and digital output (I/O) lines, multiple channels of analog to digital conversion, timer/counter and an RS232 I/O.

In view of the foregoing it will be seen that one aspect of the present invention is to provide an ex-situ mounted grain moisture analyzer for a combine thresher.

Another aspect of the present invention is to provide a self-contained grain moisture analyzer for continuously bypassing and testing a portion of the grain harvested by a combine thresher.

Yet another aspect of the present invention is to provide an ex-situ mounted grain moisture analyzer which operates only when the test cell of the analyzer is full.

These and other aspects of the present invention will be more fully understood upon a careful review of the following description of the preferred embodiment when considered in conjunction with the accompanying drawings.

BRIEF DESCRIPTION OF THE DRAWINGS

FIG. 7. is a plot of the cell full detector of FIG. 6 operation under slowly filling grain condition.

DESCRIPTION OF THE PREFERRED EMBODIMENT

Figure 1:
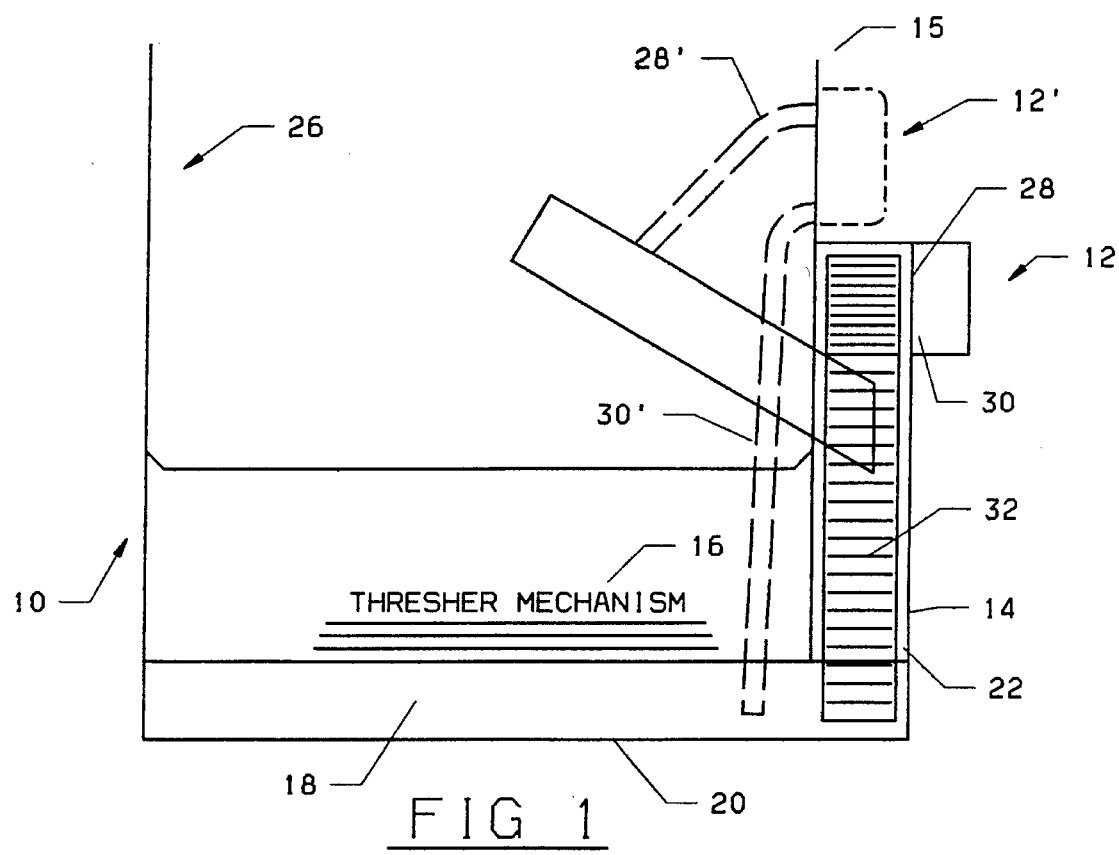
FIG. 1. is a cut-away vertical schematic of a combine thresher of the present invention showing two possible mountings of an ex-situ moisture analyzer assembly thereon.

Referring to the drawings in general and to FIG. 1. in particular, a combine thresher (10) is shown having a grain moisture analyzing assembly (12) mounted to an external surface thereof; the grain elevator housing (14) in this particular example. This type of mount is referred to as an ex-situ mount.

Only the basic elements of the combine thresher (10) which are important for an understanding of the present invention are shown in FIG. 1. a thresher mechanism (16) is used for cutting the grain plant. After cutting and threshing the plant, the grain falls through a series of grates (18) to a floor (20) where it is moved by an auger (not shown) toward an elevator (22). The elevator (22) picks up the grain and lifts it to an intermediate level behind the elevator (not shown) where it is picked up by a bin auger (24). The bin auger (24) carries the grain up and discharges it into a grain accumulation. bin (26).

Two possible locations for ex-situ mounting the moisture analyzer assembly (12) are on the bin auger (24) or the external surface near the bin auger (24) such as the elevator (22). The first location is near or at the end of the bin auger (24) (not shown) while the other is ex-situ of the combine on an outside wall thereof such as on the external wall (14) of the elevator (22) as shown in FIG. 1. In both cases the momentum of the moving grain (driven in one case by the bin auger (24) and in the other by the elevator (22) provides a driving force or momentum that causes the grain to flow easily through an inlet opening (28) into the assembly (12) and back out into the elevator (22) through an outlet (30). The elevator (22) usually consists of paddles (32) which transports the grain from the floor (20) to the bin auger (24). The moisture sensing assembly (12) could also be mounted to an outside wall (15) of the combine near the elevator (22) as shown by (12') in FIG. 1. The inlet of the assembly (12') is connected to the auger (24) by a pipe (28') while the outlet of the assembly (12') is exhausted to the grain floor (20) by a pipe (30'). The outlet pipe (30') could also be exhausted into other locations such as the bin (26) the elevator (22) or the bin auger (24).

The foregoing ex-situ mounting of the analyzer assembly (12) provides for a continuous bypass and moisture measurement of the grain through the grain moisture analyzer assembly (12) by simply and easily forming two holes (28), (30) on the outside surface of the combine (10) elevator (22) and mounting the assembly (12) thereto or by connecting two pipes (28'; 30') to the wall (15) mounting the assembly (12') to thus provide an inexpensive and easily mounted retrofit unit for the combine aftermarket.

Figure 2:
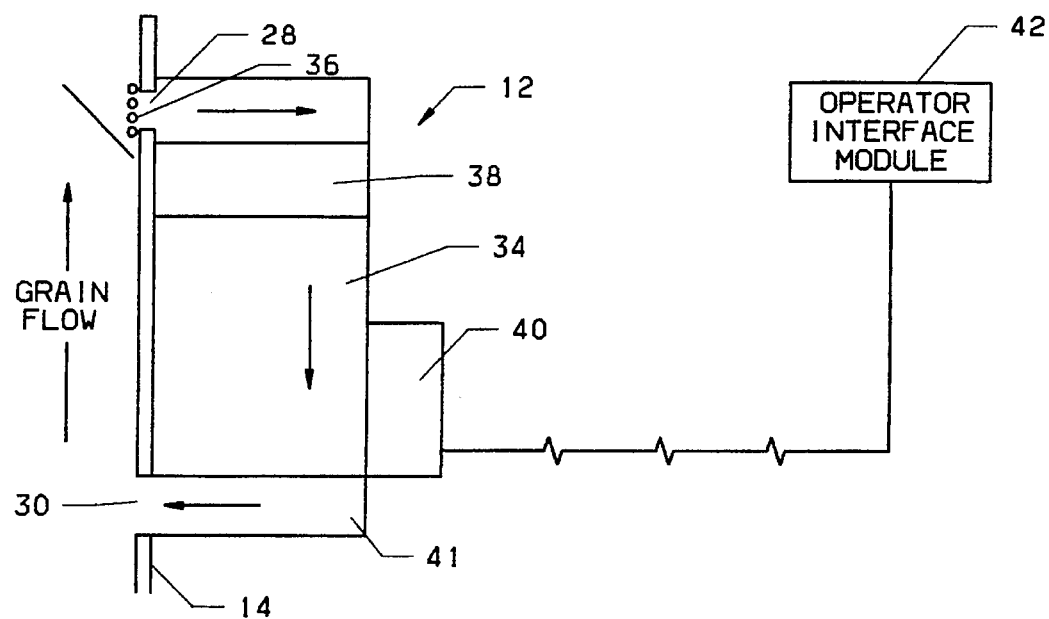
FIG. 2. is a block schematic of the ex-situ moisture analyzer assembly of FIG. 1. showing the bypass of harvested grain therethrough.

Referring now to FIG. 2. it can be seen that the inlet (28) in the elevator wall (14) allows a small portion of the grain stream flowing in the elevator (22) to enter and fill a sensing cell (34) where grain moisture is measured. A coarse screen (36) over the inlet (28) prevents large objects (corn cobs, etc.) from entering and jamming the sample cell (34).

The sensing cell (34) is a known impedance constant volume type moisture measurement cell which may be a capacitance type cell. To obtain a valid measurement of moisture such sensing cells must be full of grain. Hence, a detector (38) is located above the cell (34) which monitors the grain level. As long as the cell (34) is not full, microprocessor based sensor electronics (40) defers measurement and closes the exit (30) of the cell (34) by shutting down a flow device (41) such as an auxiliary auger or trap door so that grain will accumulate in the cell (34). When the cell-full detector (38) indicates valid sampling conditions the sensor circuit (40) begins to read and transmit the moisture signal to an operator interface module (42) where the moisture measurements are displayed. Once the cell (34) is filled and readout begun a first microprocessor (44) in the electronics (42) maintains flow through the cell by on/off control of the flow device (41) using the cell-full detector (38) to provide the control feedback signal.

Figure 3:
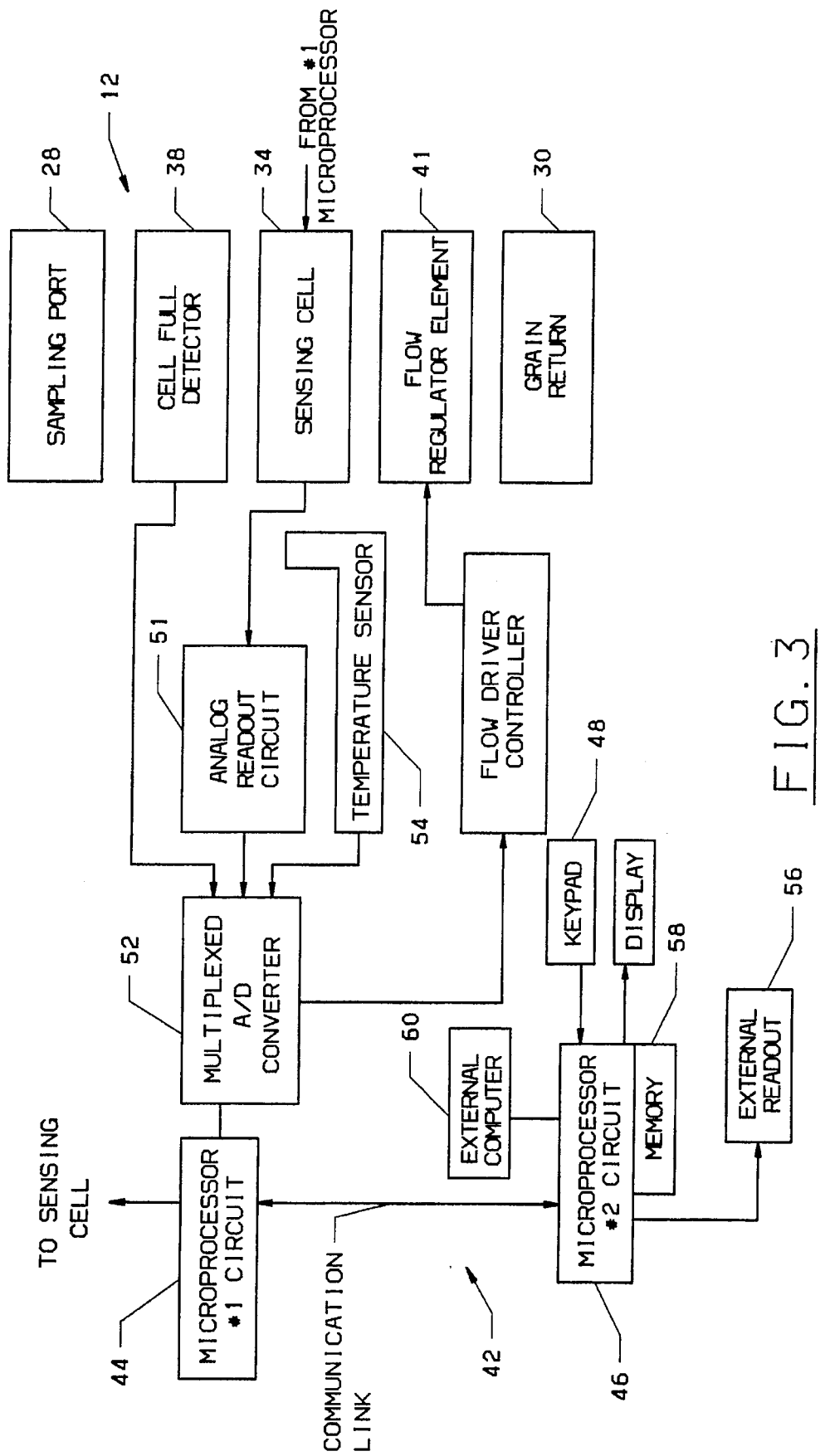
FIG. 3. is a functional block diagram of the moisture analyzer assembly of FIG. 2.

The operator interface module (42) is shown in FIG. 3 to contain a first and second microprocessor (44), (46). The second microprocessor (46) based circuit provides a display of the measured moisture and also operator inputs via a keypad (48). The operator inputs via the keypad (48) are used to:

specify the type of grain being harvested. This is necessary since the readout signal is converted to moisture using grain specific calibration information that is predetermined and stored in memory.

initiate the beginning of an averaging period. The display shows not only the instantaneous value of the moisture but also a cumulative average value. The operator can press a reset button (not shown) on the keypad (48) to begin a new averaging period at any time.

As discussed above, grain flow through the sensing cell (34) is regulated to insure that there is continual movement of new grain through the sensing cell (34). Grain exiting the cell is recycled by dumping it back to the elevator, the grain floor, or any other convenient low back pressure point within the combine.

Figure 4:
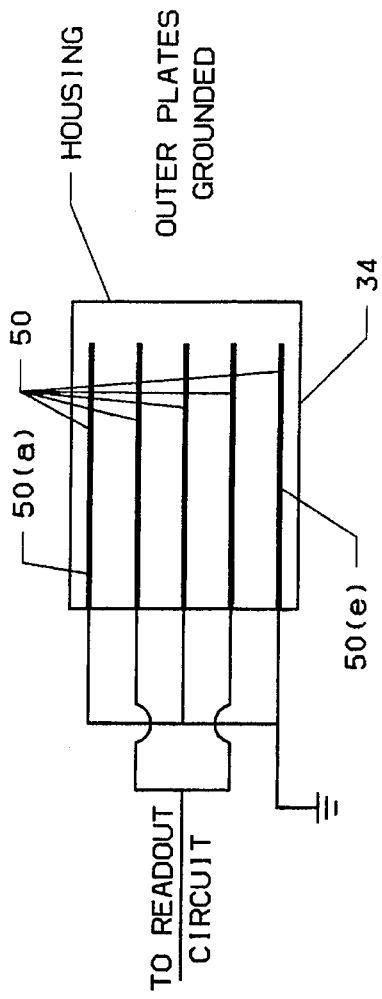
FIG. 4. is a top cross-sectional view of the sensing cell of the FIG. 2 analyzer assembly.

As best seen in FIG. 4., the sensing cell (34) contains a set of parallel metal plates (50) that are connected to an analog readout circuit (51). This circuit generates a DC output voltage that is dependent upon the moisture content of the grain between the electrodes. The signal voltage is input to an analog to digital converter (52) to put it into a format suitable for the microprocessor (44). Analog signals from the cell full detector and from one or more temperature sensors (54) are also input to the A/D converter. The temperature signals are used to compensate the moisture readings for variations in temperature of the grain.

The flow regulator element (41) which may be an auger, a solenoid driven trap door or other known means is controlled by the microprocessor (44) using the cell full detector (38) signal for feedback.

The first microprocessor circuit (44) converts the sensor cell (34) output, modifies it by the temperature sensor (54) output to a moisture signal and communicates the resultant information to the second microprocessor (46) circuit which provides outputs to a readout module (56).

The second microprocessor (46) circuit provides an alphanumeric display of the results for the operator. The display indicates the type of grain and shows both instantaneous and average value of the measured moisture. The user can initiate a new averaging period at anytime by pressing the reset button on the keypad (48). In response to the reset signal the microprocessor (46) automatically stores the result of the existing average in memory (58) and begins a new averaging sequence. At the end of a run the results from memory (58) which consist of a series of average values can be redisplayed by a keypad (48) request or can be uploaded to an external computer (60).

As was described, the moisture-analyzer system electronics uses two intercommunicating microprocessors (44), (46). There are a variety of ways in which the system functions can be shared between the two microprocessors (44), (46). We have described only one of many possible configurations that will provide the same functionality.

Figure 4A:
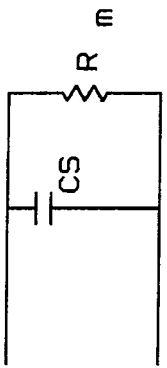
FIG. 4(a) is an equivalent electric circuit representation of the sensing cell of FIG. 4.

Referring to FIG. 4., the impedance type moisture sensor has five plates (50) configured with the two outer plates (50a; 50e) grounded to minimize sensitivity to stray capacitance from the surroundings. Clearly a three plate sensor with grounded outside plates could have been used. Also, with this configuration of five plates (50) by virtue of the outer plates (50a; 50e) being grounded, both EMI (electro magnetic interference) and RFI (radio frequency interference) is reduced. Alternate plates (50) are electrically connected in common to form four measuring chambers each of which measures one-fourth of the cell grain. The interconnection of the plates in effect averages the signals from the individual chambers to provide a more accurate moisture measurement of the total cell grain moisture. Clearly, more plates (not shown) can be added (with alternate plates being connected in common) to increase the overall magnitude of the sensor signal. As seen in FIG. 4a the sensing cell (34) as seen by the readout circuit 51 can be represented as a capacitor $C_s$ electrically connected in parallel with a resistor $R_m$. Both $R_m$ and $C_s$ are functions of moisture through the terms S and $\epsilon$ respectively as equations:

$$R_m = d/SA(n-1)$$

$$C_s = (n-1)\epsilon A/d$$

where:

n=number of plates d=plate separation

A=plate area

S=conductivity of grain $\epsilon$=dielectric constant of grain

Figure 5:
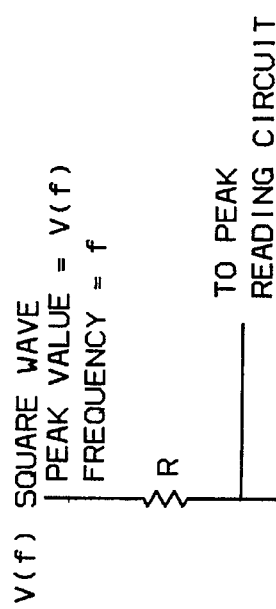
FIG. 5 is an electrical schematic of the hookup of the FIG. 4 cell.

The sensing cell (34) is shown in FIG. 5 connected through a charging resistor R, to a square wave voltage of frequency, f and amplitude V(f) that is generated by the microprocessor (44). A peak reading circuit hooked across the sensing cell (34) then gives a DC output voltage:

$$V_{OUT} = V(f)\{A - BR_e(1 - e^{-t/2R_eC_s})\} \quad (1)$$

where:

A and B are known constants t=1/f is the period of the excitation square wave and $R_e$ is the parallel combination of R and $R_m$ i.e.

$$R_e = R*R_m/(R+R_m) \quad (2)$$

only are S and $\epsilon$ (and consequently $R_m$ and $C_s$) both dependent on moisture but they are also both dependent on frequency. The sensitivity, the change of $V_{OUT}$ with moisture depends on both moisture and frequency. To cover the broadest range of moisture while maintaining optimum sensitivity, the microprocessor (44) can be programmed to automatically set the frequency to the optimum.

Optimum sensitivity can be shown, by differentiation of Equation 1, to occur when:

$$t/2R_eC_s = 2$$

Thus, the following program may be used to have the microprocessor (44) select the optimum frequency:

The microprocessor first applies a DC voltage to the cell and measures the resultant, $V_{OUT}$. Since the value of t for a DC voltage is infinite, the DC condition causes the exponential term in Equation 1 to go to zero, the microprocessor can calculate $R_e$ from Equation 1 using known values of the constants A and B along with the measured value of $V_{OUT}$.

The microprocessor then applies a known square wave frequency to the cell and measures the resultant $V_{OUT}$. The value of the product $R_eC_s$ is then calculated using the measured $V_{OUT}$ in Equation 1.

Finally, knowing the product $R_eC_s$ the microprocessor then calculates the value of t (and hence f) necessary to satisfy the optimization condition of Equation 3. These outlined steps are easily programmed into the microprocessor (44) as a series of sequential mathematical calculations with the results from same performing the necessary control function and a detailed analysis is deleted herein for the sake of conciseness and readability.

Figure 6:
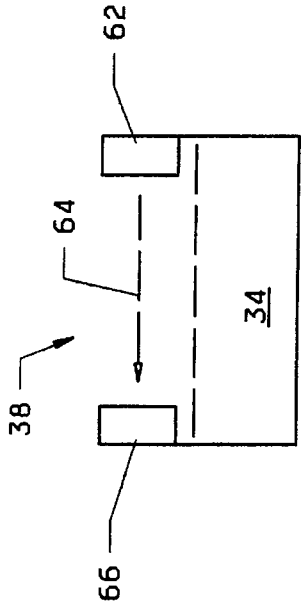
FIG. 6. is a schematic of the cell full detector of the analyzer assembly of FIG. 3.

As best seen with particular reference to FIG. 6, the cell-full detector (38) consists of an infrared or visible light emitting diode (62) that shines a beam (64) across the sensing cell (34) above the electrode plates (50) to illuminate a photodetector (66). When the cell (34) is empty or only partially full, the photo detector (66) produces a signal in response to the illumination beam (64). When the cell (34) is filled with grain, the beam (64) is prevented from reaching the photo detector (66) whose signal therefore drops to zero (below noise level).

The source (64) and photo detector (66) are mounted on opposing sides of the sample cell (34) or for convenience, they can be on the same cell wall, with line of sight connection being provided via reflection from the far wall.

The cell-full detector (38) must be able to distinguish between full and the case where grain is slowly flowing into the cell so that there is some grain in the line of sight between source and photo detector. A series of experiments were run which confirm that the detector (66) would not indicate full due to a partial filling flow.

The FIG. 7 plots results typical of these tests. The plot shows that a measurable signal is able to penetrate through 10 cm of corn kernels. This means that if the total path length between source and receiver is 20 cm, a non filling flow would have to occupy more than 50% of the cell volume before the cell-full detectors output would indicate full. If the harvested grain flow is enough to fill 50% of the cell volume, it will fill it completely. The area of concern is when there is not a sufficient grain stream force to push a sample through the analyzer's sampling port.

We obtained data similar to that shown in FIG. 6 for six different grains, and six different optical light sources. All six sources were LED's. They covered a range of "color" characteristics as well as a range of beam widths. Based on these tests we chose a 940 nm emitter (NEC#SE307-C) as the preferred source.

The preferred photo detector is a photo diode (VACTEC#VTP8441)run in the photo conductive mode. This detector provides: high sensitivity, low noise, and low cost.

It will be understood that certain details of known equipment, modifications and improvements were deleted from the foregoing description for the sake of conciseness and readability. However, all such improvements and modifications are intended to fall within the scope of the following claims.

What is claimed is:

1. A combine thresher having a continuous grain moisture analyzer comprising:

a combine thresher having means for moving grain from a grain floor of the combine to a storage bin therein with said moving means being enclosed by an external wall of said combine;

a grain moisture analyzer assembly mounted ex-situ on said external wall of said combine; and means for bypassing a portion of the grain passing through said moving means through said grain moisture analyzer including an inlet opening and an outlet opening formed in said external wall of said combine for supplying and exhausting grain to and from said grain moisture analyzer;

a sensing cell for measuring grain moisture; and feed means for moving the grain from said sensing cell to said outlet opening formed in said external wall for returning said portion of grain back into a normal flow of moving grain within the combine thresher.

2. A combine as set forth in claim 1 including means for determining the grain moisture content when said sensing cell is filled with grain and establishing a control signal indicative thereof.

3. A combine as set forth in claim 2 including microprocessor means responsive to said control signal for activating said feed means to exhaust grain from said sensing cell to thereby establish a bypass of a portion of the grain in said moving means.

4. A combine as set forth in claim 3 wherein said moving means includes a grain floor, a grain elevator and a bin auger and wherein said inlet opening is formed to communicate with said grain elevator and said outlet opening is formed to communicate with said bin auger.

5. A combine as set forth in claim 3 wherein said moving means includes a grain floor, a grain elevator and a bin auger and wherein said inlet opening is formed to communicate with said bin auger.

6. A combine as set forth in claim 3 wherein said moving means includes a grain floor, a grain elevator and a bin auger and wherein said inlet opening is formed to communicate with said elevator.

7. A continuous grain moisture analyzer assembly suitable for ex-situ mounting on an external surface of a combine harvester providing access to grain therein comprising;

a sensing cell for measuring the moisture of grain filling said cell;

detector means for sensing the full condition of said sensing cell and establishing a control signal indicative thereof;

flow means for moving grain from said sensing cell in response to the control signal from said detector means; and wherein said sensing cell includes an impedance cell having a plurality of plates to increase the measuring sensitivity of the moisture analyzer and with the external two plates being ground plates to reduce EMI and RFI interference thereby.

8. A grain analyzer as set forth in claim 7 wherein said detector means includes a light emitting diode located proximate to said sensing cell top surface to emit a light beam there along and a photo receiver located proximate to said sensing cell top surface to receive said light beam from said light emitting diode whenever said sensing cell is not filled with grain and to not receive said light beam whenever said sensing cell is filled with grain.

9. A grain analyzer as set forth in claim 7 including an operator interface module for controlling said analyzer assembly in response to operator inputs and control signals from said analyzer assembly.

10. A grain analyzer as set forth in claim 9 wherein said operator interface module includes a first microprocessor connected to said detector means to actuate said flow means in response to said control signal from said detector means.

11. A grain analyzer as set forth in claim 10 wherein said operator interface module includes a second microprocessor communicating with said first microprocessor and having a keypad for providing operator inputs thereto.

12. A grain analyzer as set forth in claim 11 wherein said first microprocessor converts the output signal from said sample cell to a grain moisture reading using stored conversion information and communicates same to said second microprocessor to be averaged therein in response to an operator command inputted over said keypad.

13. A grain analyzer as set forth in claim 12 wherein said second microprocessor has a memory for storing the averaged grain moisture readings and displaying same to a visual display as well as forwarding same to an external computer for further processing.

14. A method of providing continuous grain moisture readings of the grain being harvested to a combine harvester operator comprising the steps of:

passing a portion of the grain being harvested from the combine to a moisture analyzer sensing cell mounted ex-situ of the combine;

filling said sensing cell with passed grain;

actuating the passing of the grain from the sensor cell back to the combine to provide a continuous bypass of grain from the combine through the sensor cell and continuous moisture measurement thereby; and automatically setting the frequency of the cell voltage to an optimum frequency for detecting the broadest range of moisture sensed by the cell.

15. A method as set forth in claim 14 including the further calculating step of averaging of continuous grain moisture measurements over an operator determined period.

16. A method as set forth in claim 15 including the stopping of the bypass of grain to the sensing cell whenever the sensing cell is not filled with grain..

17. A method as set forth in claim 16 including the stopping of grain moisture measurements whenever the sensing cell is not filled with grain.

18. A method as set forth in claim 17 including the displaying to the combine operator of the type of grain being harvested along with the moisture content thereof.

19. A combine as set forth in claim 1 wherein said grain moisture analyzer assembly includes an impedance cell having a plurality of plates to increase the measuring sensitivity of the moisture analyzer and with the external two plates being ground plates to reduce EMI and RFI interference thereby.

20. A combine as set forth in claim 19 wherein said plurality of plates is five plates with two central readout plates and three ground plates forming four separate measuring chambers.

21. A grain moisture analyzing assembly as set forth in claim 7 wherein said plurality of plates is five plates with two central readout plates and three ground plates forming four separate measuring chambers.

22. A grain moisture analyzing assembly as set forth in claim 21 wherein two of said three ground plates are the outer plates of said five plate assembly.

23. A method as set forth in claim 14 including the step of passing the portion of the grain to a plurality of sensing cells formed from a five plate impedance sensing cell having a pair of central plates and three ground plates.

24. A method as set forth in claim 14 including the step of passing the portion of the grain to a sensing cell formed from an impedance moisture measuring cell having a plurality of plates for increased measurement sensitivity.

25. A method as set forth in claim 14 including the step of passing the portion of the grain to a sensing cell formed from an impedance moisture measuring cell having a pair of external ground plates to minimize EMI and RFI interference thereby.

26. A method as set forth in claim 14 wherein the step of automatically setting the frequency includes the step of solving the equation $$V_{OUT} = V(f)\{A - BR_e(1 - e^{-t/2ReCs})\}$$

by a microprocessor after the application of a DC voltage to the cell.

27. A method as set forth in claim 26 including the step of applying a known squarewave frequency to the cell and measuring the resultant $V_{OUT}$ in the equation $$V_{OUT} = V(f)\{A - BR_e(1 - e^{-t/2ReCs})\}.$$

28. A method as set forth in claim 27 including the step of solving the equation $$V_{OUT} = V(f)\{A - BR_e(1 - e^{-t/2ReCs})\}$$

for t and hence the optimal frequency.

29. A continuous grain moisture analyzer assembly suitable for ex-situ mounting on an external surface of a combine harvester providing access to grain therein comprising;

a sensing cell for measuring the moisture of grain filling said cell;

detector means for sensing the full condition of said sensing cell and establishing a control signal indicative thereof;

flow means for moving grain from said sensing cell in response to the control signal from said detector means; and an operator interface module for controlling said analyzer assembly in response to operator inputs and control signals from said analyzer assembly.

30. A method of providing continuous grain moisture readings of the grain being harvested to a combine harvester operator comprising the steps of;

passing a portion of the grain being harvested from the combine to a moisture analyzer sensing cell mounted ex-situ of the combine;

filling said sensing cell with the passed grain;

actuating the passing of the grain from the sensor cell back to the combine to provide a continuous bypass of grain from the combine through the sensor cell and continuous moist measurement thereby; and passing the portion of the grain to a sensing cell formed from an impedance moisture measuring cell having a plurality of plates for increased measurement sensitivity.

\* \* \* \* \*